Figure 1:
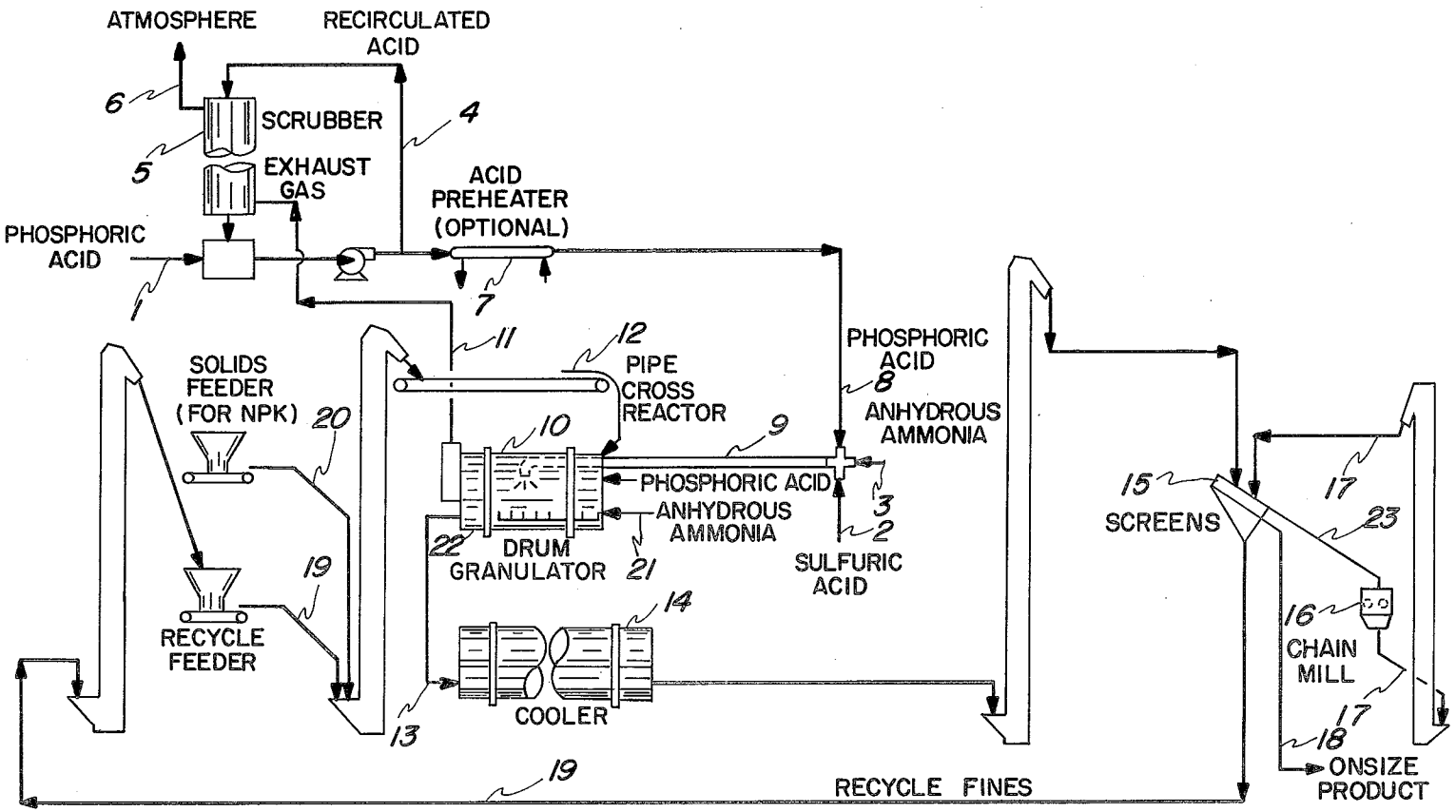
Figure 2:
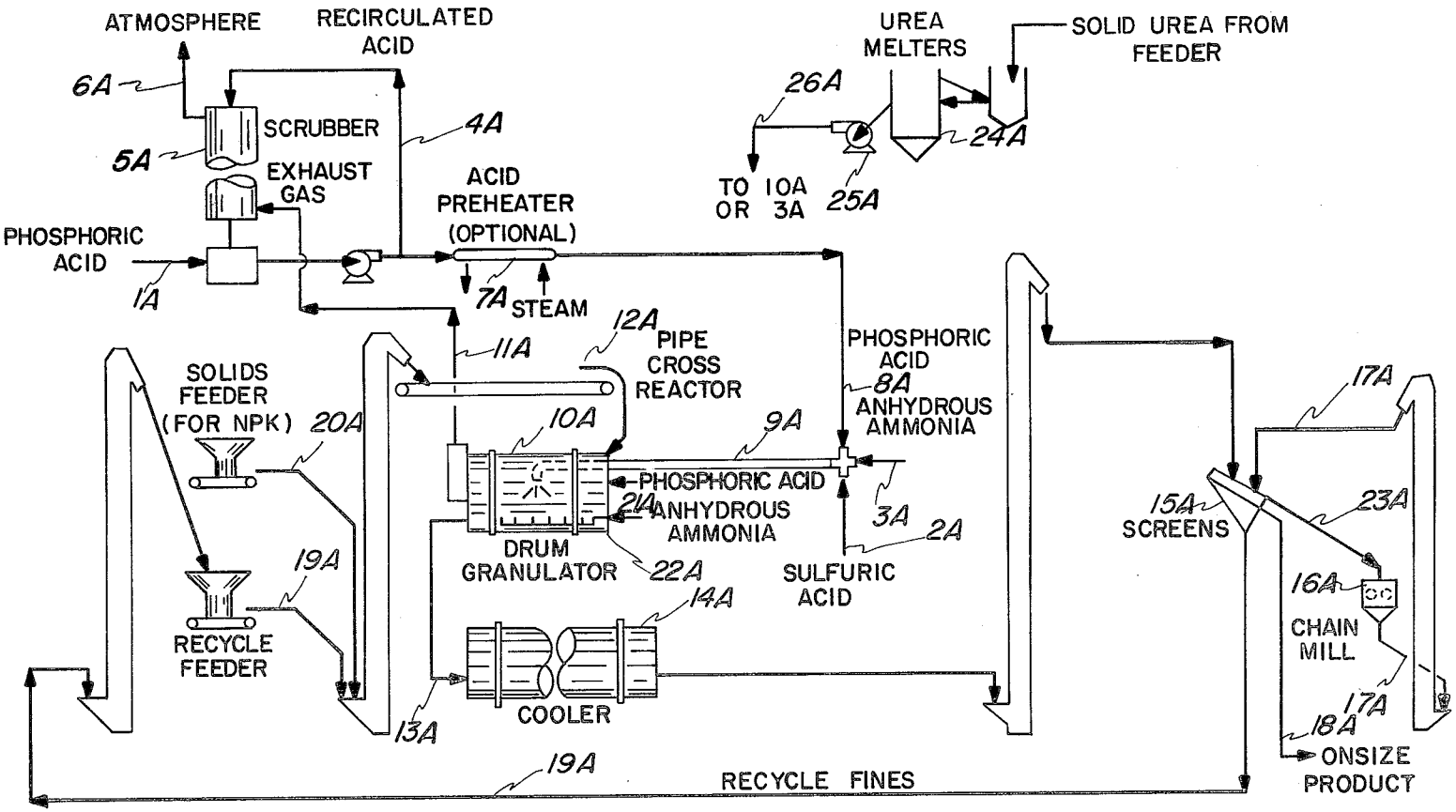
Figure 3:
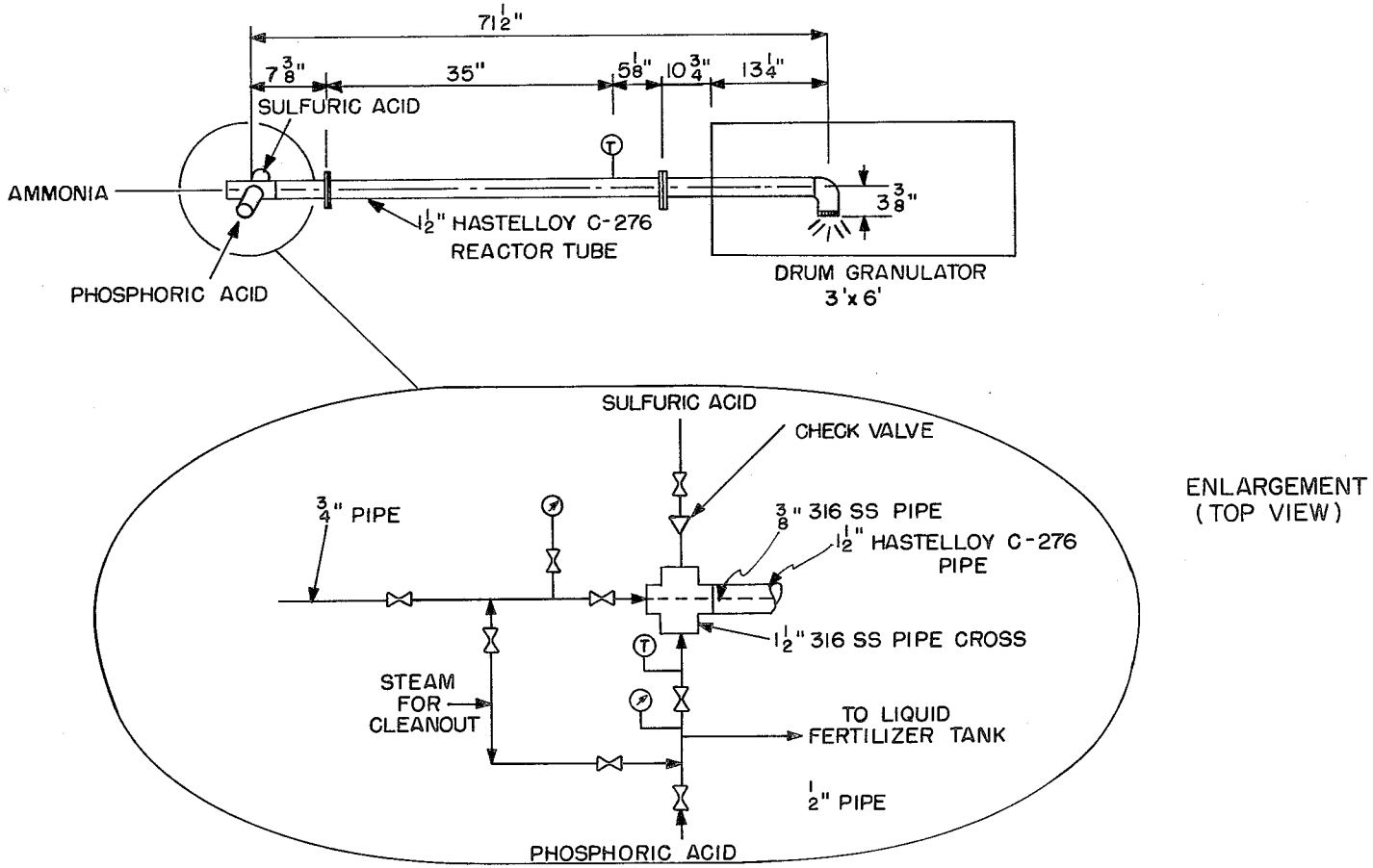
Figure 4:
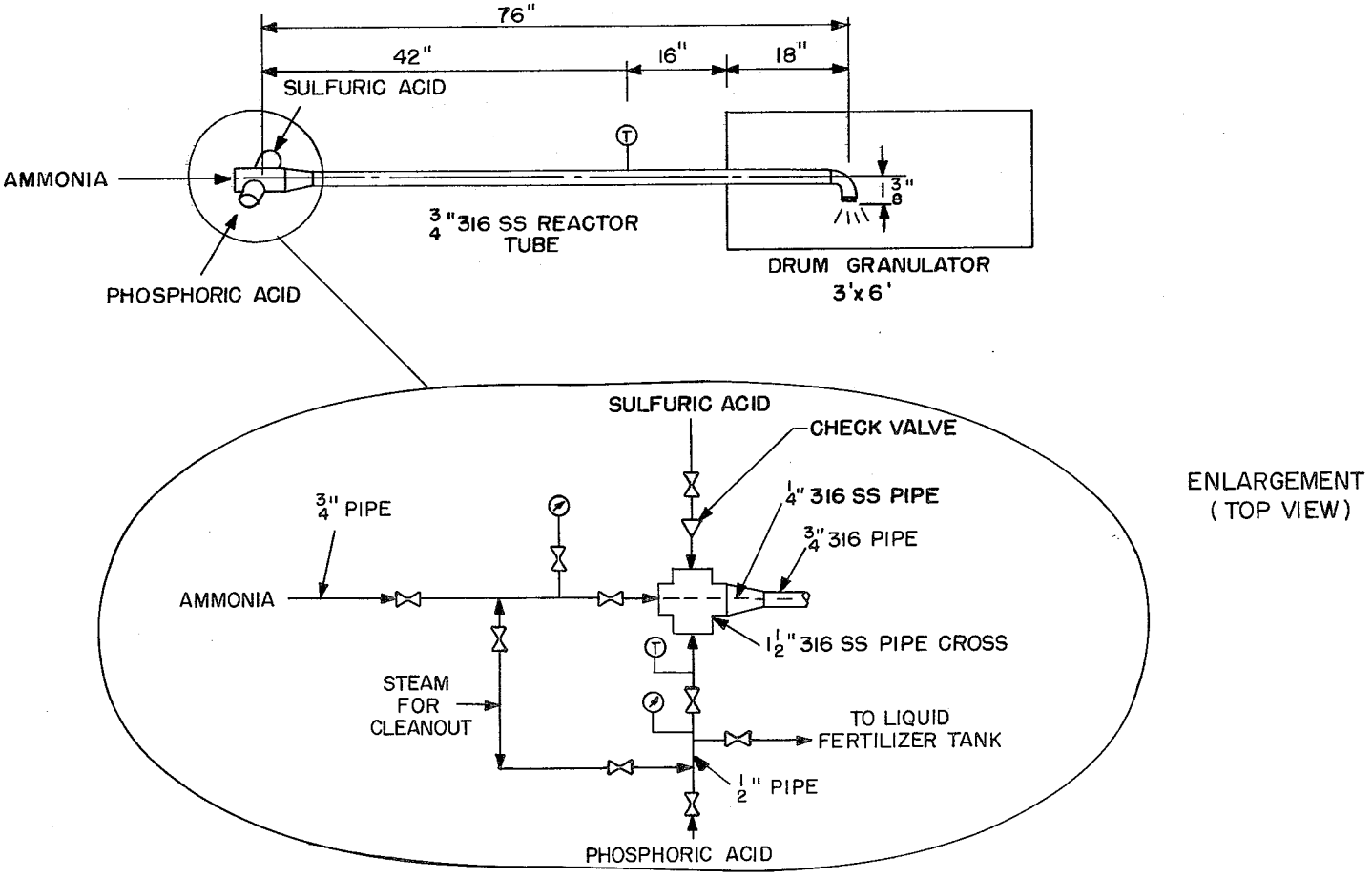
Figure 5:
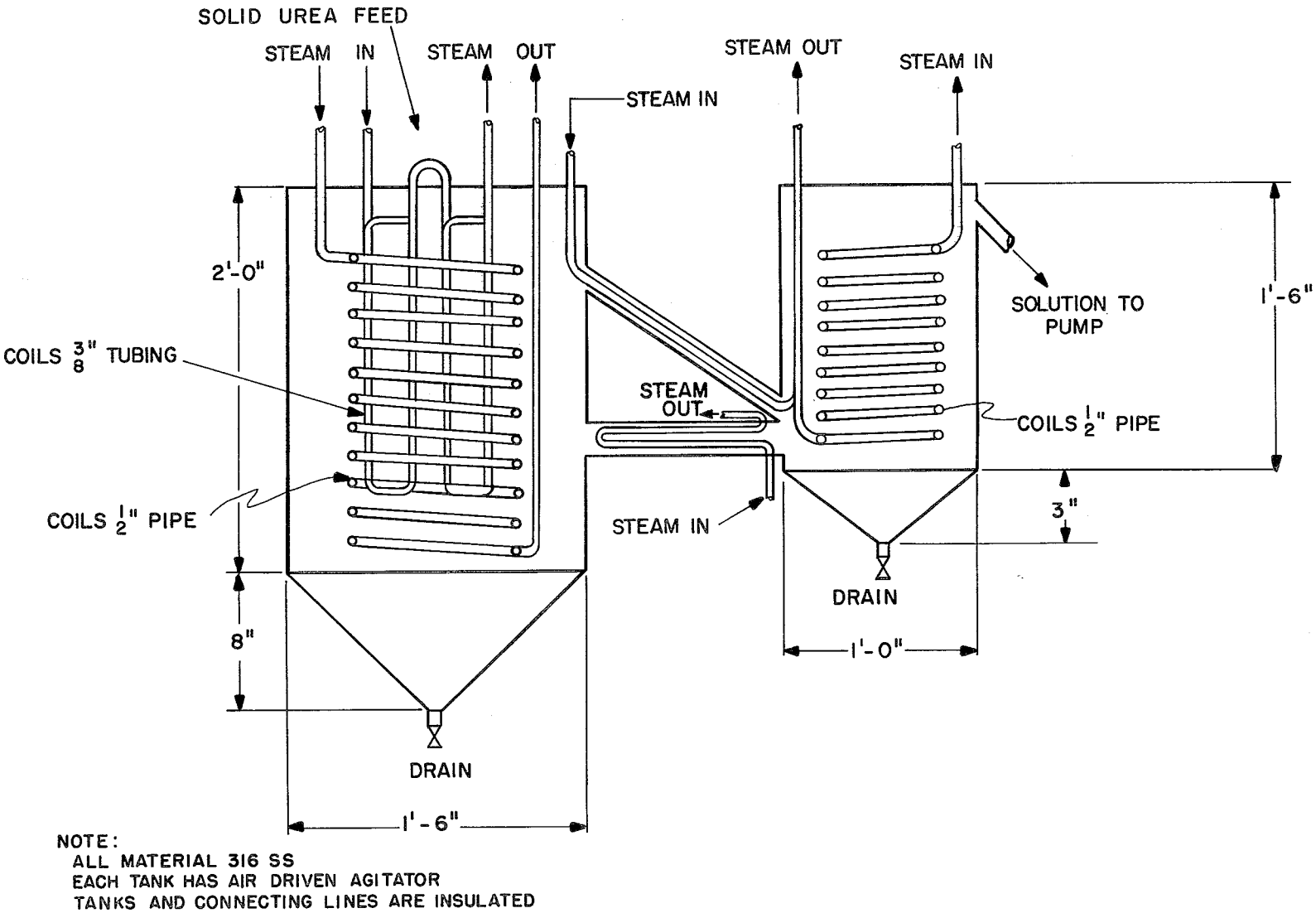
Figure 6:
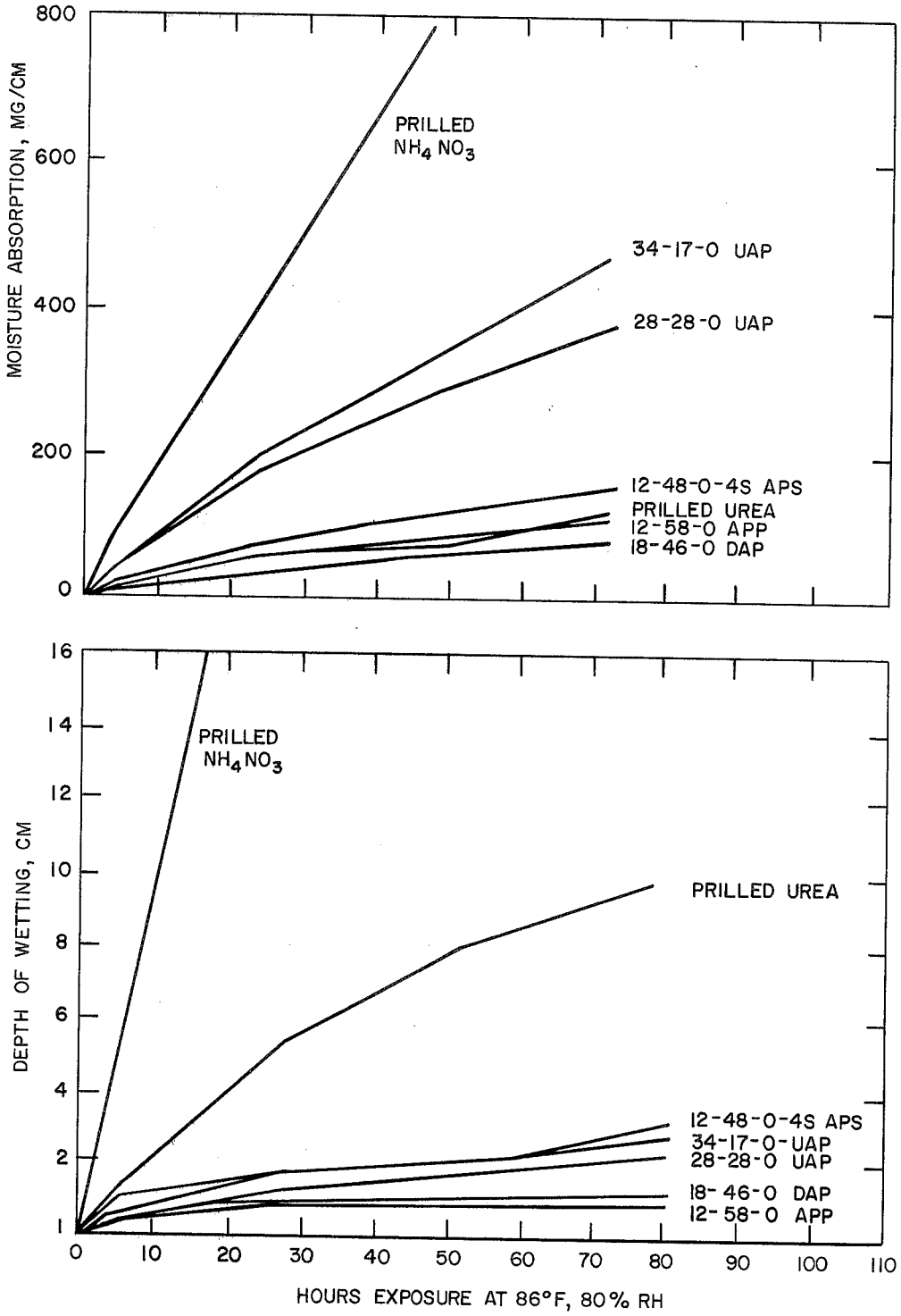
Figure 7:
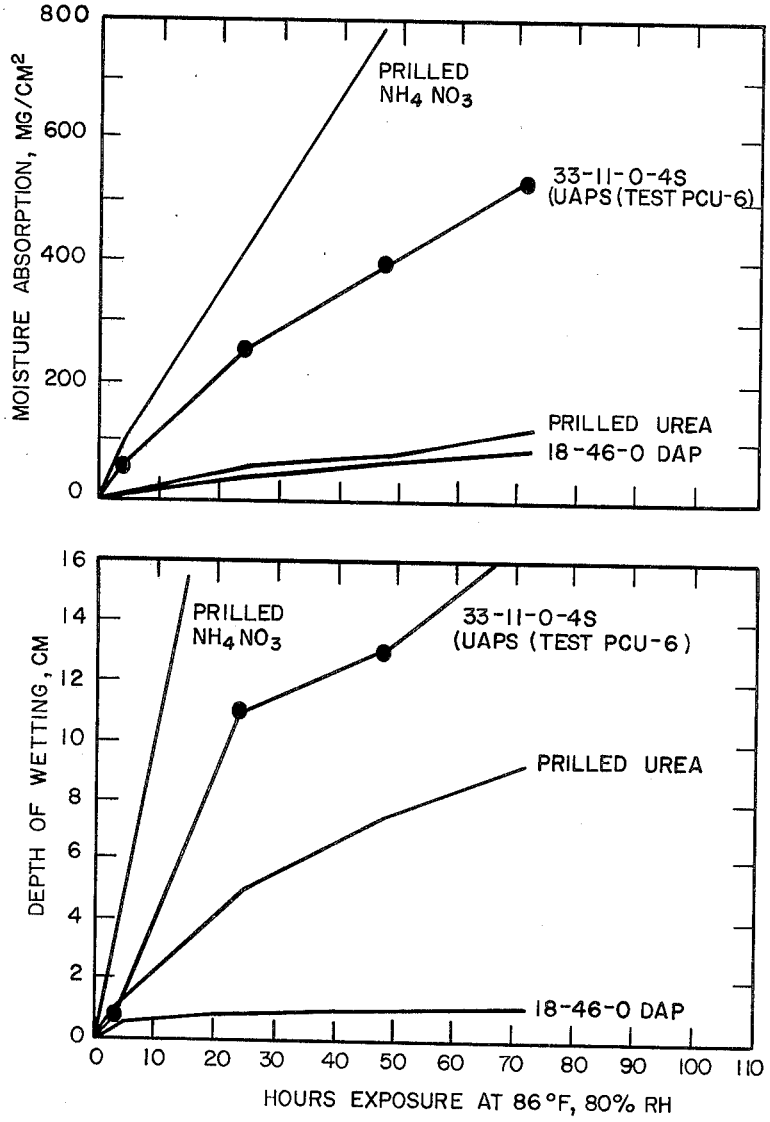

United States Defensive Publication [19] (H) [11] T969,002

Norton et al. [43] Apr. 4, 1978

[54] GRANULAR AMMONIUM PHOSPHATE SULFATE AND UREA-AMMONIUM PHOSPHATE SULFATE USING A COMMON PIPE-CROSS REACTOR

[75] Inventors: Melvin M. Norton, Sheffield; Byron R. Parker, Florence, both of Ala.

[73] Assignee: Tennessee Valley Authority, Muscle Shoals, Ala.

[21] Appl. No.: 818,602

[22] Filed: Jul. 25, 1977

[51] Int. Cl.[2] ..... C05C 9/00; C05B 7/00

[52] U.S. Cl. ..... 71/29; 71/34; 71/37; 71/43; 423/313

[57] ABSTRACT

Process for production of fertilizers from phosphoric and sulfuric acids, anhydrous ammonia, and urea, and for the production of high-analysis granular ammonium phosphates, ammonium phosphate sulfates, and urea-ammonium phosphate sulfates—some with polyphosphate contents of up to 68 percent of the total $P_2O_5$. A specially designed pipe-cross reactor is used to produce a homogeneous melt or slurry of low moisture content from the reactants and thus eliminates the need for a preneutralizer as used in many prior-art granular fertilizer processes. Because of the low melt or slurry moisture content, the dryer is eliminated. The elimination of these two items greatly simplifies pollution abatement, since both items are sources of fumes and dust. The equipment used to produce granular monoammonium phosphate, diammonium phosphate, urea-ammonium phosphate sulfate, and ammonium phosphate sulfate fertilizers is inexpensive and simple to operate. The products produced are dust-free and of such particle size that they are well suited for bulk blends. Ammonium phosphate sulfate grades of 12-48-0, 6-24-24, 13-13-13, 10-40-10, a monoammonium phosphate grade of 11-55-0, a diammonium phosphate and diammonium phosphate sulfate grade of 18-46-0, and urea-ammonium phosphate sulfate grades of 33-11-0, 17-17-17, and 20-10-10 have been produced.

7 Claims, 7 Sheets Drawing,

33 Pages Specification

The file of this unexamined application may be inspected and copies thereof may be purchased (849 O.G. 1221, Apr. 9, 1968).

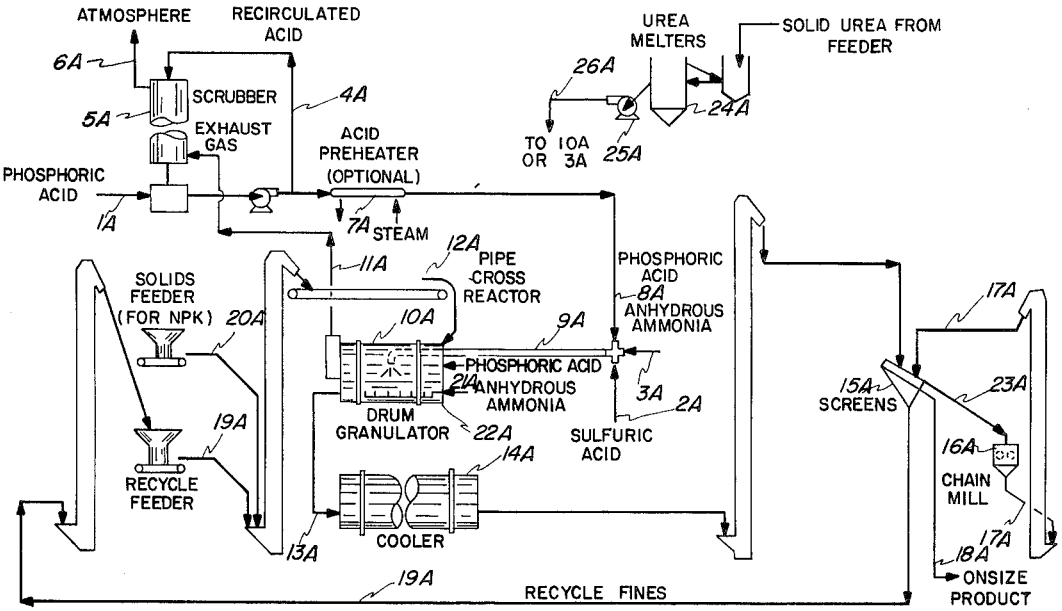

FLOWSHEET OF THE GRANULATION PILOT-PLANT FOR PRODUCTION OF UREA-AMMONIUM PHOSPHATE SULFATE FERTILIZER USING PIPE-CROSS REACTOR

FLOWSHEET OF THE GRANULATION PILOT-PLANT FOR PRODUCTION OF GRANULAR FERTILIZER USING PIPE-CROSS REACTOR

FLOWSHEET OF THE GRANULATION PILOT-PLANT FOR PRODUCTION OF UREA-AMMONIUM PHOSPHATE SULFATE FERTILIZER USING PIPE-CROSS REACTOR

PIPE-CROSS REACTOR WITH 1 1/2 INCH REACTION TUBE

PIPE-CROSS REACTOR WITH 3/4" INCH REACTION TUBE

GRANULATION PILOT-PLANT UREA MELTER

EXPOSURE-PENETRATION TESTS

EXPOSURE-PENETRATION TESTS